2,789,907

METHOD OF PRODUCING A BOTTOM- OR TOP-FERMENTED BEER HAVING A HIGH MALT EXTRACT AND A LOW ALCOHOL CONTENT

Albrecht Haselbach, Saarbrucken, Germany

No Drawing. Application January 14, 1953,
Serial No. 331,307

Claims priority, application Germany February 21, 1952

9 Claims. (Cl. 99—43)

The invention relates to a method of producing a bottom- or top-fermented beer having a high malt extract and a low alcohol content, and if desired containing vitamines, and its essential feature consists in that a determined mixture of fermented beer and beer pitched for a short time is subjected in a closed and if desired heatable or coolable vessel to further, preferably warm fermenting, which is broken off in known manner as soon as the desired alcohol content has been reached.

It is thus possible in simple and reliable manner to produce a beer having a good taste and a high malt extract content and an exactly determined low alcohol content of, for example, 1%, or more or less as desired.

Hitherto it has generally been attempted to produce a low alcohol content by restricting the activity of the yeast by cold. The physiological, enzymatic, and colloidal fermentation processes are of course correspondingly reduced thereby, and beers were obtained the taste of which was not satisfactory.

Without the application of cold, however, certain difficulties occurred in practice.

If in fact the fermentation of a normal beer, i. e., of a beer having an original wort content of about 11 to 14%, based only on malt content, is continued at normal fermentation temperatures as far as an alcohol content of 1%, a very considerable increase of the yeast will already have taken place. In order to remove the yeast, large filter or centrifuge capacities are necessary. Filtering is necessary, however, because the beer, which is extremely turbid in this condition, would be unpleasant in appearance, and would certainly be refused by the consumer, if only for aesthetic reasons. In addition, it is almost impossible in this advanced stage of fermentation to select a determined moment for its interruption. Since the fermentation is then already proceeding at full speed, the slightest delay may frustrate the desired low alcohol content.

If, however, such fermentation is interrupted already at an alcohol content of about 0.5%, it is true that the yeast in the beer has not increased so greatly and the interruption of the fermentation is simpler, but little of the characteristic taste of beer has yet been formed.

Even if it were desired to obtain an alcohol content of about 0.5% in the final product, it is impossible with the direct method of fermentation hitherto customary for the entire product, and also when applying low fermenting temperatures, either to determine accurately and reliably, to within 0.1%, the desired alcohol content in advance, as would be absolutely desirable, in order to be able to keep it precisely within determined limits, nor to eliminate the wort taste satisfactorily within the time available.

The process of the present invention provides a remedy in this respect.

In order to be able to interrupt the fermentation already in the stage of very low yeast increase, and neverthless to obtain a beer character which would occur only in a later stage of fermentation, there is added, to a beer pitched in the usual manner in an open vessel wtih yeast, raised with air (and therefore a beer in which fermentation has been started), after a few hours as much fermented beer as is needed in order to obtain on completion of the process the higher alcohol content (of for example 1%) which is desired for reasons of taste but which normally is too unreliably obtained This mixture is poured for the purpose of further fermentation into a closed vessel, the contents of which may if desired be heatable or coolable from the inside or from the outside, and which preferably withstands a pressure of about 5 to 6 atmospheres (kg./cm.$^2$) gauge.

This further fermentation is not carried out in the cold, but preferably in the warm state, in order to promote particularly the fermentation processes and to obtain particular maturity and agreeable flavour.

The interruption of this fermentation takes place after the desired alcohol content has been reached, in manner known per se by one of the following methods: (a) heating, or (b) cooling, or (c) centrifuging, or (d) filtering, while it is advantageous to select the mixture from the outset in such manner that through the further fermentation the carbon dioxide content which is normal for a beer has just been reached by the time fermentation is broken off.

In case (a), the mixture is heated on completion of the further fermentation until all yeasts and bacteria have been killed off at high temperatures, and the mixture is then cooled. During such operation, as is well known, the yeast cells burst and the yeast cell juice passes into the beer, which is thus vitaminised. The yeast cell skins remaining in such a beer promote the peristalsis of the large intestine. It has a fuller taste than cold-treated and then filtered beer.

The treatment of the mixture in case (a) is carried out advantageously in the vessels which are provided for the subsequent consumer or dealer. If it is not desired to add carbon dioxide, the vessels can be filled with the beer mixture without counterpressure, whereupon the vessels are closed.

On the other hand, in cases (b) to (d), a special closed fermenting vessel must be used and the mixture must be filled under counter-pressure therefrom through centrifuges or filters into the vessels provided for the consumer or dealer.

Special vitaminising, for example by introducing clear yeast cell juice, would here be unnecessary, if the case (a) were brought to completion in the special closed vessel before applying cases (c)–(d).

In cases (b) to (d), the filling must be germ-proof or the mixture must be pasteurised.

If case (b) is combined with one of cases (c) or (d), time can be taken with the centrifuging or filtering, which is very helpful to the division of labour.

In all four cases, in consequence of the previously effected mixing, an interruption of fermentation can be achieved at an alcohol content of for example 1%, with such operational certainty that in the case of sugaring in the brewing house it is even possible to work up into highly fermentable types of sugar, in order to obtain a really sweet taste which will promote sales.

The constituents of the mixture are conveniently approximately from the same original wort, so that rather more or less pitched beer may be added. The degree of fermentation of the fermented beer, which usually varies slightly, can then be balanced, without fearing differences in the colour of the final product.

Purely bottom-fermenting or purely top-fermenting may be applied to the process. The proportion of fermented beer in the mixture can be kept rather higher if before the further fermentation carbon dioxide is added to the mixture.

*Example*

During a brewing prepared with the aid of a little caramel- and colour-malt, a saccharification temperature of 65° C. (149° F.) is maintained for 90 minutes, and thereupon final saccharification is effected at 75° C. (167° F.) for a short time. The beer, boiled with a little hops, cooled to 15° C. (59° F.), and then exhibiting 12.5% of original wort, is prepared with 0.5 litre of yeast in the form of a thin paste per hectolitre in an open pitching vat and ventilated a short time as for normal fermentation. After some hours, to each hectolitre of this beer, which in the meantime has already been slightly pitched, there is added 0.145 hectolitre of fermented, uncasked beer having an original wort content of 11.4% and a saccharometer indication of 3.7%. Immediately thereafter bottles holding 0.5 litre were filled with the mixture, without counter-pressure, so full that later on a pressure of 5 to 6 atmospheres gauge was produced on heating the contents of the bottle to 72° C. (161.5° F.). The bottles are firmly closed and kept for some time at a temperature of about 32° C. (89.5° F.). Their contents, which after mixing showed a saccharometer reading of 11.4%, then showed a reading of about 10.7%. The temperature in the bottle was thereupon raised to 72° C. (161.5° F.), whereupon its contents show a reading of about 10.5% and an alcohol content of about 0.85%. As a precaution the temperature of 72° C. (161.5° F.) was maintained for two hours, and then the bottles were slowly cooled.

I claim:

1. A method of making beer having a high malt-extract content and a predetermined final low alcohol content, comprising the steps of mixing in a closed vessel fermented beer including its original alcohol content which has been formed during production of said fermented beer, said original alcohol content being higher than said predetermined final low alcohol content and a fermentable incompletely fermented beer having an alcohol content lower than said predetermined final low alcohol content and including malt and yeast, said fermented beer and fermentable beer having substantially equal predetermined proportions of original wort content therein and being mixed in such proportions that the alcohol content of the obtained mixture is lower than said predetermined final low alcohol content; heating the thus produced mixture in a closed vessel to fermentation temperature so as to ferment the same thereby increasing the alcohol content thereof while preventing escape of alcohol therefrom; and terminating said fermentation of the mixture when the alcohol content thereof has risen to said predetermined final low alcohol content, thereby forming a beer having a high malt-extract content and said predetermined final low alcohol content.

2. A method of making beer having a high malt-extract content and a predetermined final low alcohol content, comprising the steps of mixing in a closed vessel fermented beer including its original alcohol content which has been formed during production of said fermented beer, said original alcohol content being higher than said predetermined final low alcohol content and a fermentable incompletely fermented beer having an alcohol content lower than said predetermined final low alcohol content and including malt and yeast, said fermented beer and said incompletely fermented beer being mixed in such proportions that the alcohol content of the obtained mixture is lower than said predetermined final low alcohol content; subjecting the thus produced mixture to fermentation in a closed vessel thereby increasing the alcohol content thereof while preventing escape of alcohol therefrom; and terminating said fermentation of the mixture when the alcohol content thereof has risen to said predetermined final low alcohol content, thereby forming a beer having a high malt-extract content and said predetermined final low alcohol content, the ratio of the components of the mixture being such that a predetermined carbon dioxide content is present in the resulting beer when the fermentation thereof is interrupted.

3. A method of making beer having a high malt-extract content and a predetermined final low alcohol content, comprising the steps of mixing in a closed vessel fermented beer including its original alcohol content which has been formed during production of said fermented beer, said original alcohol content being higher than said predetermined final low alcohol content and a fermentable incompletely fermented beer having an alcohol content lower than said predetermined final low alcohol content and including malt and yeast, said fermented beer and said incompletely fermented beer being mixed in such proportions that the alcohol content of the obtained mixture is lower than said predetermined final low alcohol content; subjecting the thus produced mixture to fermentation in a closed vessel thereby increasing the alcohol content thereof while preventing escape of alcohol therefrom; terminating said fermentation of the mixture when the alcohol content thereof has risen to said predetermined final low alcohol content, thereby forming a beer having a high malt-extract content and low alcohol content; and said predetermined final heating the thus formed beer in a closed container below the boiling point thereof at a temperature and for a sufficient period to destroy the yeast and bacteria therein.

4. A method of making beer having a high malt-extract content and a predetermined final low alcohol content, comprising the steps of mixing in a closed vessel fermented beer including its original alcohol content which has been formed during production of said fermented beer, said original alcohol content being higher than said predetermined final low alcohol content and a fermentable incompletely fermented beer having an alcohol content lower than said predetermined final low alcohol content and including malt and yeast, said fermented beer and said incompletely fermented beer being mixed in such proportions that the alcohol content of the obtained mixture is lower than said predetermined final low alcohol content; subjecting the thus produced mixture to fermentation in a closed vessel thereby increasing the alcohol content thereof while preventing escape of alcohol therefrom; terminating said fermentation of the mixture when the alcohol content thereof has risen to said predetermined final low alcohol content, thereby forming a beer having a high malt extract content and said predetermined final low alcohol content; treating the thus formed beer to cool and clarify the same; and placing the thus treated beer under counter-pressure into containers for consumer use.

5. A method of making beer having a high malt-extract content and a predetermined final low alcohol content, comprising the steps of mixing in a closed vessel fermented beer including its original alcohol content which has been formed during production of said fermented beer, said original alcohol content being higher than said predetermined final low alcohol content and a fermentable incompletely fermented beer having an alcohol content lower than said predetermined final low alcohol content and including malt and yeast, said fermented beer and said incompletely fermented beer being mixed in such proportions that the alcohol content of the obtained mixture is lower than said predetermined final low alcohol content; placing the thus produced mixture into containers for consumer use; heating the thus produced mixture while in said containers to fermentation temperature so as to ferment the same and at a temperature sufficient to produce a pressure in said containers of about 5 to 6 atmospheres gauge thereby increasing the alcohol content in the mixture while preventing escape of alcohol therefrom; and terminating the fermentation of the mixture while in said containers when the alcohol content thereof has risen to said predetermined final low alcohol content, thereby forming a beer having a high malt-extract content and said predetermined final low alcohol content.

6. A method of making beer having a high malt-extract content and a predetermined final low alcohol content, comprising the steps of mixing in a closed vessel fermented beer including its original alcohol content which has been formed during production of said fermented beer, said original alcohol content being higher than said predetermined final low alcohol content and a fermentable incompletely fermented beer having an alcohol content lower than said predetermined final low alcohol content and including malt and yeast, said fermented beer and said incompletely fermented beer being mixed in such proportions that the alcohol content of the obtained mixture is lower than said predetermined final low alcohol content; adding carbon dioxide to the thus formed mixture and subjecting the thus produced mixture to fermentation in a closed vessel thereby increasing the alcohol content thereof while preventing escape of alcohol therefrom; and terminating said fermentation of the mixture when the alcohol content thereof has risen to said predetermined final low alcohol content, thereby forming a beer having a high malt-extract content and said predetermined final low alcohol content.

7. A method of making beer having a high malt-extract content and a predetermined final low alcohol content, comprising the steps of mixing a fermented beer including its original alcohol content which has been formed during production of said fermented beer, said original alcohol content being higher than said predetermined final low alcohol content, and a fermentable incompletely fermented beer having an alcohol content lower than said predetermined final low alcohol content and including malt and yeast, said fermented beer and said incompletely fermented beer being mixed in such proportions that the alcohol content of the obtained mixture is lower than said predetermined final low alcohol content; subjecting the thus produced mixture to warm fermentation in a closed vessel thereby increasing the alcohol content thereof while preventing escape of alcohol therefrom; and terminating said warm fermentation of the mixture when the alcohol content thereof has risen to said predetermined final low alcohol content, thereby forming a beer having a high malt-extract content and said predetermined final low alcohol content.

8. A method of making beer having a high malt-extract content and a predetermined final low alcohol content, comprising the steps of mixing a fermented beer including its original alcohol content which has been formed during production of said fermented beer, said original alcohol content being higher than said predetermined final low alcohol content, and a fermentable incompletely fermented beer having an alcohol content lower than said predetermined final low alcohol content and including malt and yeast, said fermented beer and said incompletely fermented beer being mixed in such proportions that the alcohol content of the obtained mixture is lower than said predetermined final low alcohol content; subjecting the thus produced mixture to fermentation in a closed vessel thereby increasing the alcohol content thereof while preventing escape of alcohol therefrom; and terminating said fermentation of the mixture when the alcohol content thereof has risen to said predetermined final low alcohol content, thereby forming a beer having a high malt-extract content and said predetermined final low alcohol content.

9. A method of making beer having a high malt-extract content and a predetermined final low alcohol content, comprising the steps of mixing a fermented beer including its original alcohol content which has been formed during production of said fermented beer, said original alcohol content being higher than said predetermined final low alcohol content, and a fermentable incompletely fermented wort having an alcohol content lower than said predetermined final low alcohol content and including malt and yeast, said fermented beer and said incompletely fermented wort being mixed in such proportions that the alcohol content of the obtained mixture is lower than said predetermined final low alcohol content; subjecting the thus produced mixture to fermentation in a closed vessel thereby increasing the alcohol content thereof while preventing escape of alcohol therefrom; and terminating said fermentation of the mixture when the alcohol content thereof has risen to said predetermined final low alcohol content, thereby forming a beer having a high malt-extract content and said predetermined final low alcohol content.

References Cited in the file of this patent

UNITED STATES PATENTS

| 1,421,737 | Stahl | June 4, 1922 |
| 1,537,252 | Meyer et al. | May 12, 1925 |
| 1,717,685 | Heuser | June 18, 1929 |